United States Patent [19]

Grosvernier

[11] 4,367,045
[45] Jan. 4, 1983

[54] METHOD AND APPARATUS FOR CHECKING THE WIDTH AND PARALLELISM OF MARGINS FOLLOWING CENTERING OF A PRINT WITH RESPECT TO A SUPPORT

[75] Inventor: Claude-Arnold Grosvernier, Hauterive, Switzerland

[73] Assignee: Compagnie Industrielle Radioelectrique, Switzerland

[21] Appl. No.: 224,911

[22] Filed: Jan. 14, 1981

Related U.S. Application Data

[63] Continuation of Ser. No. 957,412, Nov. 3, 1978, abandoned.

[30] Foreign Application Priority Data

Nov. 4, 1977 [CH] Switzerland ............. 13417/77

[51] Int. Cl.³ .............. G01B 11/00; G01B 11/14
[52] U.S. Cl. ...................... 356/394; 250/561; 356/375
[58] Field of Search .......... 356/375, 394, 400; 250/561; 340/146.3 H; 364/559; 358/101

[56] References Cited

U.S. PATENT DOCUMENTS 2,220,736 11/1940 Stockbarger et al. ............ 250/571
2,840,722  6/1958 Frommer ........................ 250/202
3,412,993 11/1968 Giorgi ............................. 356/394
3,833,816  9/1974 Emura et al. ..................... 356/430
4,063,820 12/1977 Borgese .......................... 356/386

FOREIGN PATENT DOCUMENTS 1204942  9/1970 United Kingdom ........ 340/146.3 H
1216924 12/1970 United Kingdom ............... 364/559

*Primary Examiner*—William H. Punter
*Attorney, Agent, or Firm*—Robert E. Burns; Emmanuel J. Lobato; Bruce L. Adams

[57] ABSTRACT

A method and apparatus for checking the width and parallelism of margins following the centering of a print with respect to a support. The support is moved in front of two opto-electronic reading devices with the margins to be checked arranged transversely with respect to the direction of movement of the support. The reading devices are used to produce two counting periods for each margin, the widths of the periods corresponding to the widths of the margin at two points thereof. Clock pulses are produced depending on the movement of the support by means of an opto-electronic detector. Clock pulses appearing in the counting periods are counted and the resultant count compared with maximum and minimum reference values to check the width of the margins. Clock pulses appearing in one of the counting periods are counted only when the counting periods do not coincide with regard to time and the number of pulses counted is compared with a reference value representing the tolerance limit of non-parallelism.

7 Claims, 8 Drawing Figures

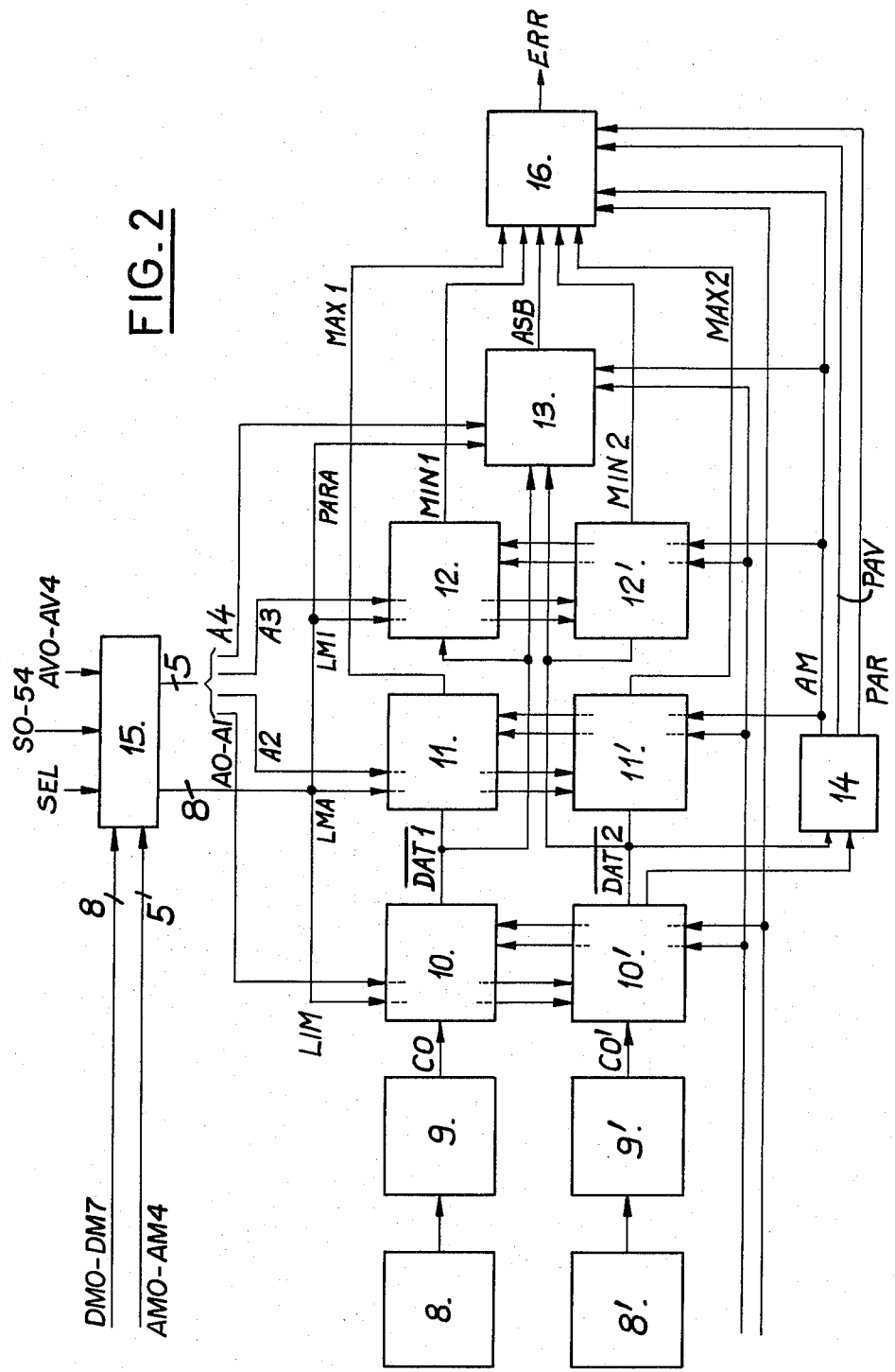

METHOD AND APPARATUS FOR CHECKING THE WIDTH AND PARALLELISM OF MARGINS FOLLOWING CENTERING OF A PRINT WITH RESPECT TO A SUPPORT

This is a continuation of application Ser. No. 957,412, filed Nov. 3, 1978, now abandoned.

FIELD OF INVENTION

The present invention relates to a method and apparatus for checking the width and parallelism of margins following centering of a print with respect to a support. The support may be for example a sheet of paper. The method relies upon movement of the support in front of opto-electronic reading devices with the margins to be checked located transversely with respect to the direction of movement.

BACKGROUND OF THE INVENTION

It has already been proposed to undertake a checking operation of this type by causing a light beam to sweep in a zig-zag path across the transverse margin and measuring the quantity of light reflected by means of a photo-electric detector and an electronic multiplier. The quantity measured and the length of pulse corresponding to the width of the margin vary however as a function of the speed of movement of the support, such that any variation of this speed renders the measurement inaccurate.

It has also been proposed to use optic fibres and to count the number of optic fibres illuminated by the light reflected by the margin and to compare this number with a reference value. The power of resolution of such a device is however relatively low owing to the dimension of the optic fibres. Moreover, it is necessary to have one detector per optic fibre.

Finally, the two methods mentioned above do not provide a measurement of the parallelism of each of the margins with the edges of the support.

SUMMARY OF THE INVENTION

It is an object of the present invention to carry out very accurate measurement of the width of the margins and of the parallelism of these margins, which measurement is independent of variations in the speed of movement of the support.

According to the present invention there is provided a method for checking the width and parallelism of margins following the centering of a print with respect to a support, wherein the support is moved in front of opto-electronic reading devices, the margins being arranged transversely with respect to the direction of movement of the support, characterized in that two counting periods are derived for each margin by means of two opto-electronic detectors, the duration of the periods corresponding to the width of the margins at two points thereof clock pulses are produced depending on the movement of the support by means of an opto-eclectronic detector, the clock pulses appearing during the counting periods are counted and each of the resultant counts is compared with maximum and minimum reference values to check the width of the margins, and the clock pulses appearing during one of the counting periods are counted only when the two counting periods do not coincide with regard to time, the number of pulses counted during non-coincidence of the periods being compared with a reference value representing the tolerance limit of non-parallelism.

Since the frequency of the clock pulses depends on the movement of the support, i.e. is preferably proportional to the speed of this movement, the result of the measurement is independent of this speed and consequently of possible variations of this speed.

The present invention also relates to an apparatus for carrying out the method, comprising means for moving a support in front of opto-electronic reading devices, characterized in that the apparatus comprises two electro-electronic detectors for deriving two counting periods for each transverse margin provided on the support, the duration of the counting periods corresponding to the width of the margins at two points thereof, an opto-electronic detector for producing clock pulses in dependence upon the movement of the support, means for counting the clock pulses appearing during the counting periods, means for comparing the resultant counts with maximum and minimum reference values to check the width of the margins, means for counting the clock pulses appearing during one of the counting periods only when the two counting periods do not coincide with regard to time, and means for comparing the number of pulses counted during non-coincidence of the periods with a reference value representing the tolerance limit of non-parallelism.

Advantageously, the two opto-electronic detectors each supply signals whereof a part exceeding a certain self-adjusting threshold constitutes a sequence of signals, and comprising a subtractor arranged to be charged before the passage of the support with a number of clock pulses corresponding to the printed length of the support, means for eliminating by deduction of the counting pulses the signals appearing between the signals corresponding to the counting periods, subtractors/comparators arranged to be charged before the passage of each margin with a number of pulses respectively representing the maximum and minimum margin widths and means for subtracting the clock pulses during the counting periods, and a counter/subtractor arranged to be charged before the passage of each margin with a reference value expressed as clock pulses corresponding to the tolerance limit of non-parallelism, and means for counting the clock pulses appearing during one of the counting periods when the counting periods are not coincident in time and for subtracting the clock pulses during the other counting period when the counting periods are not coincident in time.

BRIEF DESCRIPTION OF DRAWINGS

The accompanying drawings given by way of example, illustrate one embodiment of the invention.

In the drawings:

FIG. 2 is a circuit diagram of the checking device;

DESCRIPTION OF PREFERRED EMBODIMENT

Figure 1:
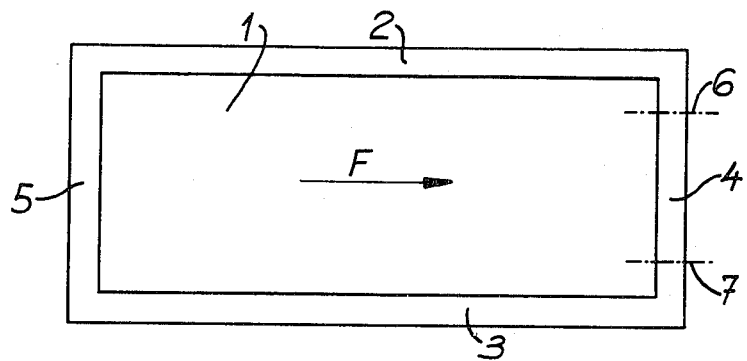
FIG. 1 diagrammatically illustrates a printed sheet and the principles employed in checking the margins of the sheet.

FIG. 1 shows diagrammatically a printed sheet moving in the direction of arrow F at a constant speed of 6.6 meters per second. This sheet comprises a central printed part 1, two side margins 2 and 3 and two margins 4 and 5 arranged transversely with respect to the direction of movement. The transverse margins 4 and 5 are checked by means of two opto-electronic devices located at 6 and 7 along the trajectory of the sheet. The maximum width of the margins, the minimum width of the margins and the parallelism of the margins with respect to the edges of the sheet are checked. The checking devices deliver an error signal after the passage of each sheet, if one of these checks is outside to tolerance limits.

According to the circuit diagram illustrated in FIG. 2, the device comprises two opto-electronic detectors 8 and 8' located respectively along the trajectories 6 and 7 and respectively associated with which are a shaper circuit 9, 9', an inhibition circuit 10, 10', a circuit 11, 11' for checking the maximum width and a circuit 12, 12' for checking the minimum width. The device also comprises a circuit 13 for checking the parallelism, an internal circuit 14 for generating pulses, a multiplexer 15 and an output circuit 16 for receiving the outputs of the checking circuits. In addition to the signals delivered by the detectors 8 and 8', the device receives the input signals CA, AB, DM0-DM7, AM0-AM4, SEL, AV0-AV4 and S0-S4.

The signal CA is supplied by an angular detector 100 known per se, for example a detector comprising a perforated or ridged disc associated with the means for driving the sheets and supplying 1451 pulses/per mm. movement. The number of pulses in signal CA is thus proportional to the speed of movement of the sheet, and the CA pulses are used as clock pulses for the various counters of the device. The signal AB is a pulse appearing before each sheet to be checked which is used for bringing the device into an initial state. The signal AB is supplied by an opto-electronic detector 101.

The eight signals DM0 to DM7 come from a checking unit constituted by a micro-processor for example. Appearing in succession on eight corresponding lines are five words of eight bits corresponding to the printed length of the sheet and to the tolerance limits for the transverse margins, those values being expressed as clock pulses.

The five data inputs AM0 to AM4 appear on the same lines DM0 to DM7. These signals are also supplied by the checking unit and make it possible to distinguish between the five binary words. The corresponding pulses make it possible to charge five eight-bit registers in succession with the corresponding data.

According to its state, the signal SEL ensures either an automatic mode of operation in which the information charged in the five registers comes from the microprocessor on lines DM0–DM7, or a manual mode of operation in which the data is read from selectors placed on cards. In the manual mode, the signals AM0-AM4 are replaced by the five signals AV0-AV4 which come from a 10 kHz oscillator installed in a device for checking the side margins, described in a parallel patent application, from which come the five lines S0-S4 which supply five Duncan selectors. Their states (OV or high impedance) are in phase with the five signals AV0-AV4.

If the sheet checked is outside the tolerance limits, the circuit 16 supplies a signal ERR used to control means for eliminating the sheet. The circuit 16 is re-set to zero by the pulse AB.

Various internal signals are also mentioned in the block diagram:

The signals A0, A1, A2, A3 and A4 correspond respectively to the signals AM0-AM4 if SEL=0 and to the signals AV0-AV4 if SEL=1. The signals A0-A1 are applied to the inhibitor circuits 10 and 10', the signals A2 to the circuits 11 and 11' for checking the maximum width, the signal A3 to the circuits 12 and 12' for checking the minimum width and the signal A4 to the circuit 13 for checking the parallelism.

The data LIM represents the printed length of the sheet. It is used for eliminating pulses supplied during the passage of the printed part of the sheet and to this end it is applied to the inhibition circuits 10 and 10'. The data LIM is coded in two words of eight bits. The most significant part is present on the data lines when the pulse A0 appears, whereas the least significant part is present when the pulse A1 appears.

The data LMA represents the maximum acceptable width of the margins. It is thus applied to the circuits 11 and 11'. It is coded in eight bits and it is present on the data lines when the pulse A2 appears.

The data LMI represents the minimum acceptable width of the margins. It is thus applied to the circuits 12 and 12'. It is coded in eight bits and it is present on the data lines when the pulse A3 appears.

The data PARA represents the tolerance limit of parallelism and it is thus applied to the circuit 13. It is coded in eight bits and it is present on the data lines when the pulse A4 appears.

The signals DAT 1 and DAT 2 define the counting periods or "windows". These signals are supplied by the inhibition circuits 10 and 10' after eliminating pulses corresponding to the printed part of the sheet. These counting windows thus correspond to the passage of the transverse margins to be checked. DAT 1 is at the upper level during the passage of a blank margin and it is at the lower level for the remainder of the time. The same is true for the signal DAT 2 for the second detector.

Figure 6:
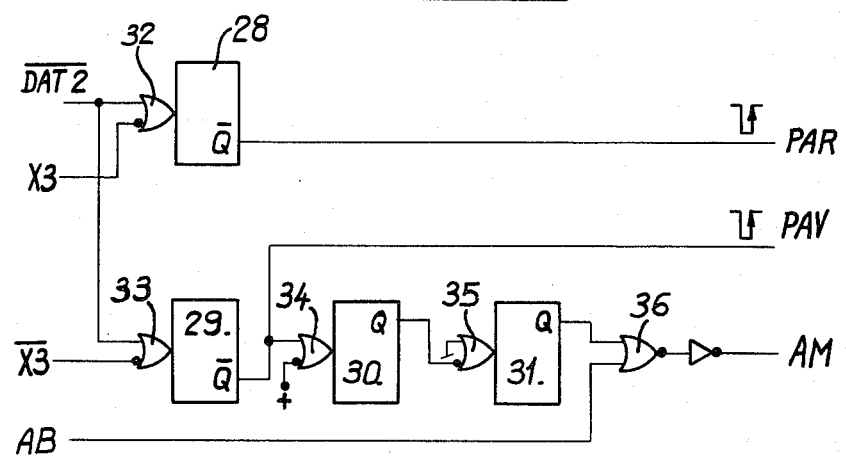
FIG. 6 shows a logic diagram for the generation of internal pulses in the device of FIG. 2.

The signal AM is formed by pulses appearing before each margin and facilitating re-setting to the initial state of the systems for detecting the maximum, minimum and parallelism, as well as a part for checking the error. The signal PAV is formed by pulses appearing after each front margin 4 and the signal PAR is formed by pulses appearing after each rear margin 5. The pulses AM, PAV and PAR are obtained by means of the circuit 14 whose logic diagram is illustrated in FIG. 6 and which will be described hereafter.

Figure 3:
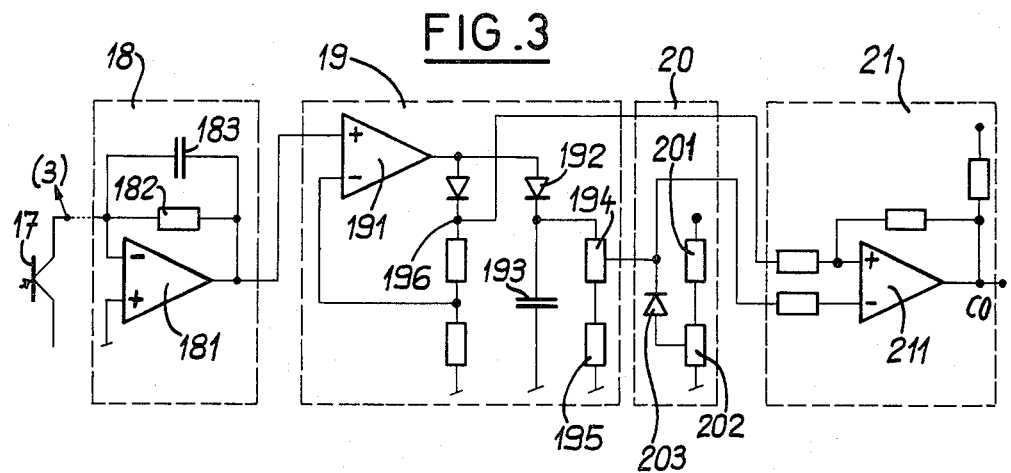
FIG. 3 shows a circuit for shaping pulses supplied by an opto-electronic detector of the device of FIG. 2.

The opto-electronic detectors 8 and 8' are constituted by an optical system and three photo-transistors 17 in parallel (FIG. 3). The remainder of FIG. 3 represents the wiring diagram of the shaper circuits 9 and 9'. These circuits comprise four stages, namely a current/voltage converter stage 18, an amplifier stage 19 serving to detect the peak value, a minimum threshold stage 20 and a comparator stage 21.

In stage 18, the current supplied by the detector is converted into a voltage by an operational amplifier assembly 181, whereof the gain may be adjusted by a potentiometer 182. An assembly of this type has the advantage of connecting the collector potential of the photo-transistor 17 to earth and thus of improving the dynamic characteristics of the system. A capacitor 183 is connected in parallel with the potentiometer 182. The effect of the capacitor is to compensate for the capacitance of a coaxial cable connecting the photo-transistor 17 to the input of stage 18. The voltage supplied by the first stage 18 is amplified in the second stage 19 by means of an operational amplifier 191. The peak value of the output signal is detected by means of a diode/capacitor arrangement respectively 192 and 193. The voltage across capacitor 193 is sampled by means of a voltage divider formed by a potentiometer 194 and a resistor 195 to form the comparison threshold. In the absence of a signal (peak value zero), the comparison threshold would be zero. The exact purpose of the stage 20 is to fix a minimum threshold by means of a voltage divider constituted by a resistor 201, a potentiometer 202 and a diode 203. The signal sampled at 196 and the threshold are compared in the comparator stage 21 constituted by a comparator with hysteresis produced by means of an operational amplifier 211.

The threshold is thus self-adjusting, i.e. it adjusts itself depending on the signal. The advantage of this is that a shaped signal CO is obtained at the output, which signal is independent over a certain range of the level of illumination of the photo-transistor 17, i.e. of the intensity of light reflected by the sheet, which intensity may vary from one sheet to another and even for one and the same sheet.

Figure 4:
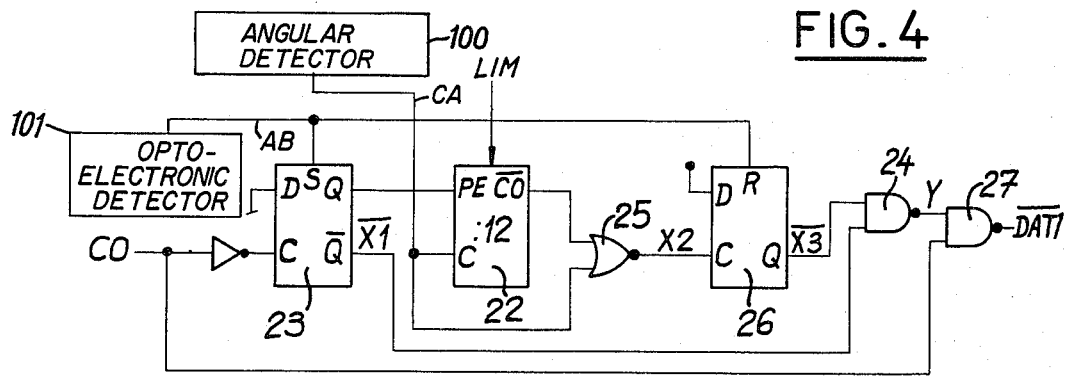
FIG. 4 shows a logic diagram of an inhibition circuit of FIG. 2.
Figure 5:
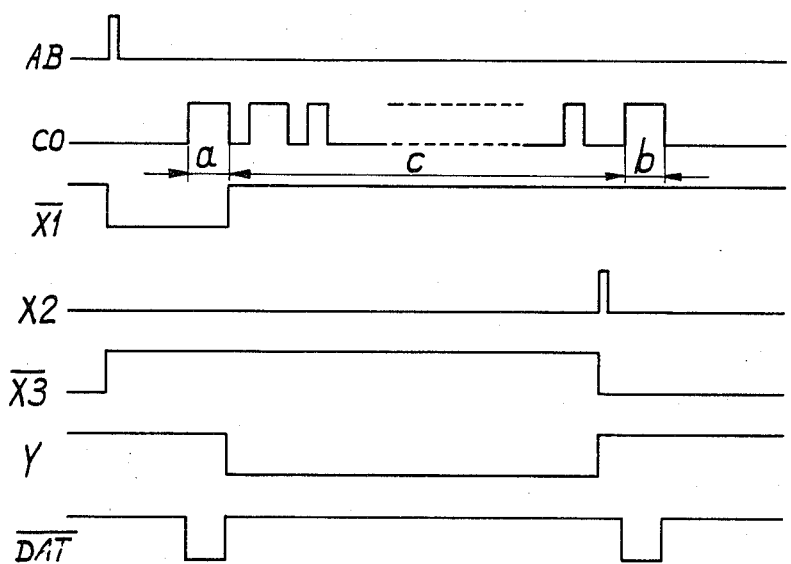
FIG. 5 shows pulses at various points of the inhibition circuit of FIG. 4.

The inhibitor circuit 10 is illustrated in FIG. 4. The circuit 10 makes it possible to obtain two counting windows DAT 1 for the front and rear margins from the signal CO supplied by the shaper circuit 9. FIG. 5 is a waveform diagram illustrating the relative timing of the various signals appearing in the circuit of FIG. 4. As regards the signal CO, the pulses a and b correspond respectively to the first and second transverse margins of the sheet, whereas the pulses c correspond to the printed part of the sheet. To obtain the counting windows, it is thus appropriate to eliminate the pulses c from the signal CO. To this end, before the passage of each sheet indicated by the signal AB, a 12 bit binary subtractor 22 is charged with the value LIM corresponding to the printed length of the sheet expressed as clock pulses. The signals AB and CO are applied to a flit-flop 23. The signal $\overline{X1}$ at the output $\overline{Q}$ of the flip-flop is applied to a NOT-AND (NAND) gate 24. The trailing edge of the first pulse CO is thus used to inhibit the signal CO during the subtraction of the counter 22 initiated by this same trailing edge. The counting down of the subtractor 22 to zero stops the inhibition of CO by the OR-gate 25 and the flip-flop 26 to which the signal AB is also applied. The next pulse CO applied to the NOT-AND gate 27 provides the second reading window DAT 1 for the rear margin 5.

FIG. 6 shows the logic diagram of the circuit 14 used for generating internal pulses PAV, PAR and AM. This circuit comprises four monostable triggers 28, 29, 30 and 31 respectively associated with four OR-gates 32 to 35 and a fifth OR-gate 36.

The pulse PAV is initiated by the sum DAT 2+X3. The pulse PAR is initiated by the sum $\overline{DAT\ 2}$+X3. The pulse AM is the logical sum of the pulse AB and of a pulse delayed with respect to PAV by means of the triggers 30 and 31.

For the detection of the maximum width, before each margin (pulse AM), an eight bit binary down counter is charged in each of the circuits 11 and 11' with the value IMA expressed in binary code as a number of clock pulses. The counter of the circuit 11 subtracts whilst $\overline{DAT\ 1}$ is at zero, whereas the counter of the circuit 11' subtracts whilst $\overline{DAT\ 2}$ is at zero. The counting down to zero of these counters is detected and a resultant signal is applied to the circuit 16.

The circuits 12 and 12' operate in the same manner. In each of these circuits, an eight binary bits down counter is charged with the value LMI representing the minimum width.

Figure 7:
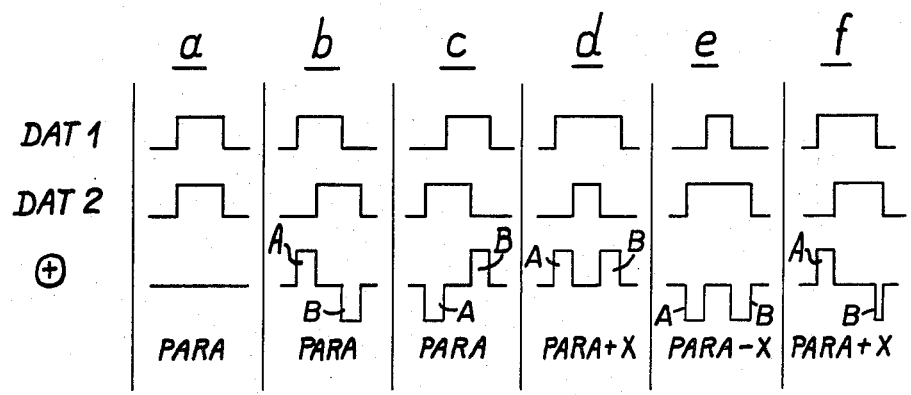
FIG. 7 shows diagrammatically various cases of measurement when checking parallelism.

To check the parallelism of the margin, it is not sufficient to measure the coincidence of the counting windows DAT 1 and DAT 2. In fact, if the sheet is not quite orientated parallel to the direction of movement, the margin will be slightly oblique with respect to this direction and the counting windows DAT 1 and DAT 2 will not coincide as regards time, even if they are of equal length. In order to take this fact into account, one proceeds as follows:

Before each margin (AM pulses), an up/down counter in the circuit 13 (FIG. 2) is charged with the value PARA expressed in binary code as a number of clock pulses. The up/down counter is active when DAT 1 is different from DAT 2. Moreover, it counts when DAT 1 is at state 1 and subtracts when DAT 1 is at state zero. The result of the counting operation gives data corresponding to the difference in width of the margins. This result is compared logically with the value 2. PARA obtained by simple shifting of one bit to a higher level. If, after the passage of a margin, the result of the counting is greater than 2. PARA or less than zero, the sheet is considered as outside the tolerance limits. A negative result is considered by the comparator as a state greater than 2. PARA. FIG. 7 illustrates various cases of measurement. The third line represents the algebraic sum of DAT 1 and DAT 2. The fourth line represents the result of the counting/subtraction. In column a DAT 1 and DAT 2 coincide with regard to time and there is neither counting nor subtraction. In column b, DAT 1 has a length equal to DAT 2, but DAT 1 leads with respect to DAT 2: the up/down counter counts a certain number of pulses during the pulse A, then subtracts the same number of pulses during the pulse B. The final value of the up/down counter thus remains equal to PARA. The same is true in the case illustrated in column c where the up/down counter begins by subtracting during the pulse A, then counting during the pulse B. In column d, DAT 2 is smaller than DAT 1 and wholly within DAT 1. The up/down counter counts during the two pulses A and B and its value is increased by a certain value X. In column e, the up/down counter subtracts during the two pulses A and B and in column f, the up/down counter counts during the pulse A and subtracts during the shorter pulse B. At the output of the comparator, a signal ASB is obtained, which is equal to zero if the result is within the tolerance limits and equal to 1 if the result is outside the tolerance limits.

Figure 8:
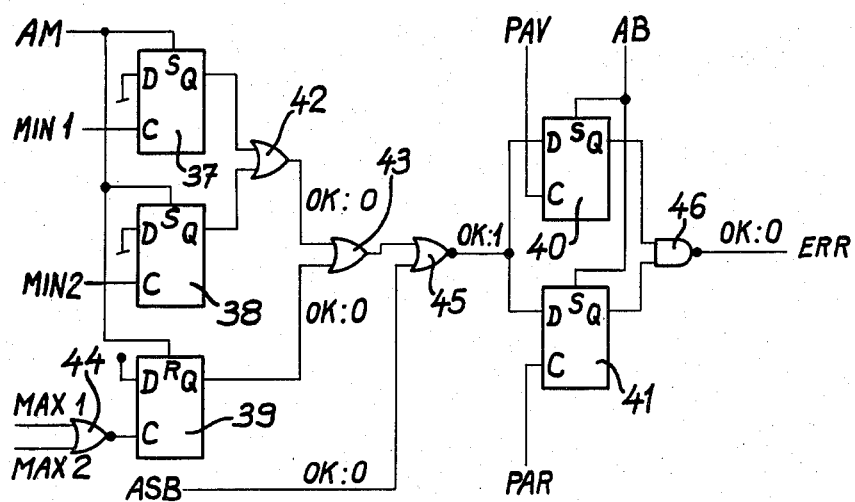
FIG. 8 shows a logic diagram for an error checking circuit.

The signals MAX 1 and MAX 2 coming from the circuits 11 and 11', MIN 1 and MIN 2 coming from the circuits 12 and 12' and the signal ASB coming from the circuit 13 are applied to the circuit 16 for checking errors whose logic diagram is illustrated in FIG. 8. The circuit comprises five flip-flops 37 to 41, two OR-gates 42 and 43, two NEITHER (NOR) gates 44 and 45 and at the output, a NOT-AND (NAND) gate 46. An error in one of the margins is characterised by the passage through zero of the counter MAX 1 or of the counter MAX 2, non-passage through zero of the counter MIN 1 or of the counter MIN 2 or by ASB=1. Before each margin, the pulse AM causes the flip-flops 38 and 39 to move to the state Q=1. Correct detections MIN 1, MIN 2 and $\overline{\text{MAX 1}+\text{MAX 2}}$ cause these flip-flops to respectively move to the state Q=zero. The flip-flop 40 is attributed to the front margin and it is re-set to the initial state by the pulse PAV appearing after the front margin, whereas the flip-flop 41 is attributed to the rear margin and it is re-set to the initial state by the pulse PAR appearing after each rear margin, if necessary. The pulse AB appearing before each sheet re-sets the flip-flops 40 and 41 to their initial state. If the output signal of the gate 46 differs from zero, this signifies that the sheet is outside the tolerance limits and the sheet is eliminated.

What I claim is:

1. In a method of checking the width and parallelism of transverse margins following the centering of a print with respect to a support, the combination of steps of moving said support in a direction perpendicular to said transverse margins in front of two opto-electronic devices which are disposed respectively at two locations spaced laterally from one another in a direction perpendicular to the direction of said movement, deriving two concurrent counting periods for each transverse margin from said two opto-electronic devices respectively the duration of said periods corresponding to the width of the transverse margins at said two laterally spaced locations corresponding to said lateral spacing of said two opto-electronic devices, producing clock pulses depending on said movement of the support by means of an opto-electronic detector, counting said clock pulses appearing during each of said counting periods, comparing the resultant counts with maximum and minimum reference values to check the width of the margins at said two laterally spaced locations, counting the clock pulses appearing during one of said counting periods at one of said locations only when said two counting periods at said two locations respectively do not coincide with regard to time, subtracting, from the last mentioned count of clock pulses, the clock pulses appearing during the other of said counting periods at the other of said locations only when said two counting periods do not coincide with regard to time, and comparing the result of this counting/subtracting with a reference value representing the tolerance limit of non-parallelism.

2. Apparatus for checking the width and parallelism of transverse margins following the centering of a print with respect to a support which comprises two opto-electronic detectors, means for moving said support in front of said opto-electronic detectors in a direction longitudinal of said support, said two opto-electronic detectors being disposed respectively at two locations spaced laterally from one another in a direction perpendicular to the direction of movement of said support, said opto-electronic detectors deriving two concurrent counting periods respectively for each transverse margin provided on said support, the duration of the counting periods corresponding to the width of the transverse margins at said two laterally spaced locations corresponding to the lateral spacing of said opto-electronic detectors, means for providing clock pulses in dependence on said movement of the support, first means for counting the clock pulses appearing during each of said two counting periods, first means for comparing the resulting counts with maximum and minimum reference values to check the width of the margins at said two laterally spaced locations respectively, second means for counting the clock pulses appearing during one of said counting periods at one of said locations only when said two counting periods at said two locations respectively do not coincide with regard to time and for subtracting the clock pulses appearing during the other of said counting periods at the other of said locations only when said two counting periods do not coincide with regard to time, and second means for comparing the result of this counting/subtracting with a reference value representing the tolerance limit of non-parallelism.

3. Apparatus according to claim 2, comprising means for eliminating said clock pulses during the passage of the printed part on said support.

4. Apparatus according to claim 2, in which said first comparing means comprises two down counters, means for charging said down counters before the passage of a margin with a number of pulses respectively representing the maximum and minimum margin width and means for subtracting said clock pulses during the counting periods.

5. Apparatus according to claim 2, in which said second means comprises an up/down counter and means for charging said up/down counter with a reference value corresponding to the tolerance limit of non-parallelism.

6. Apparatus according to claim 2, in which said means supplying the clock pulses is an angular detector.

7. Apparatus according to claim 2, comprising means for self-adjusting the threshold level of said opto-electronic detectors to make the signal outputted by said detectors independent over a certain range of the level of illumination of said support.

* * * * *